United States Patent [19]

Umezawa et al.

[11] Patent Number: 4,942,091
[45] Date of Patent: Jul. 17, 1990

[54] POLYPHENYLENE SULFONE FIBERS AND A METHOD FOR PRODUCTION THEREOF

[75] Inventors: Masao Umezawa; Toshio Tsubota; Shiro Imai, all of Shiga, Japan

[73] Assignee: Toray Industries, Inc., Tokyo, Japan

[21] Appl. No.: 223,353

[22] Filed: Jul. 25, 1988

[51] Int. Cl.$^5$ ............................................. D02G 3/00
[52] U.S. Cl. .................................. 428/398; 428/364; 428/376
[58] Field of Search .................... 428/364, 376, 398

[56] References Cited

U.S. PATENT DOCUMENTS 4,481,260 11/1984 Nohmi ................................ 428/398
4,726,987 2/1988 Trask et al. ...................... 428/282

Primary Examiner—Lorraine T. Kendell
Attorney, Agent, or Firm—Nixon & Vanderhye

[57] ABSTRACT

Polyphenylene sulfone fibers mainly consisting of a structural unit represented by a general formula

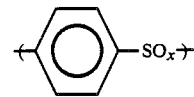

(x is 0 or 1 or 2) wherein $\bar{x}$, the average value of x, is 1.0 to 2.0, and a method for production thereof. These fibers are prepared by modifying polyphenylene sulfide fibers, whose specific surface area and degree of orientation arr more than 0.4 m$^2$/g and more than 70%, respectively, to polyphenylene sulfone fibers represented by a main constituting unit

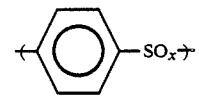

with organic peroxides.

These fibers have excellent heat and chemical resistance.

6 Claims, No Drawings

POLYPHENYLENE SULFONE FIBERS AND A METHOD FOR PRODUCTION THEREOF

TECHNOLOGICAL FIELD

The present invention relates to polyphenylene sulfone fibers having excellent heat resistance and chemical resistance and a method for production thereof.

BACKGROUND TECHNOLOGY

As polyarylene sulfone fibers, porous fibers consisting of the structural units containing ether bondings in their main chains are known. However, these so-called polyethersulfones containing ether bonds in their main chains are thermoplastic and dissolve, for example, in amide-type organic solvents, and although their heat resistance and chemical resistance are excellent, thermoplasticity and amide-type solvent solubility is a limitation thereon.

On the other hand, crystalline polyparaphenylene sulfone powder whose melting point is higher than 500° C. and having heat resistance has been known, but it is practically impossible to melt-mold or solution-mold this powder. There are, however, some examples on film of polyphenylene sulfone in Japanese Laid-Open Patent Publication Nos. 92828/1985 and 92829/1985.

Moreover, in Japanese Patent Publication No. 5370/1984, it is proposed to treat the surface of polyphenylene sulfide fibers with hydrogen peroxide or sodium hypochlorite and so on to make the fibers infusible. However, fibers obtained by this method are very brittle and have low strength. Moreover, defects such as cracks often occur and fibrillation occurs on the treated surface layers of the fibers.

DISCLOSURE OF THE INVENTION

The present invention includes polyphenylene sulfone fibers consisting essentially of structural units represented by the general formula:

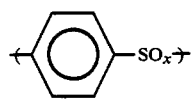

(where x is 0 or 1 or 2) and the average value of x is 1.0 to 2.0, and a method for producing these polyphenylene sulfone fibers using polyphenylene sulfide fibers whose specific surface area is larger than 0.4 m²/g and degree of orientation is more than 60% when polyphenylene sulfide fibers consisting essentially of repeating units represented by the general formula

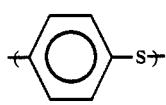

are modified with an organic peroxide to polyphenylene sulfone fibers represented by repeating units of the general fomula

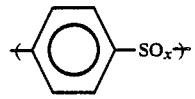

These new fibers are distinguished by their excellent chemical resistance against acids, such as sulfuric acid and the like, and chemical resistance to bases, such as sodium hydroxide aqueous solution and the like, as well as excellent heat stability at temperatures quarter than 200° C. can be offered by these fibers.

Further details of the invention are explained below.

When $\bar{x}$ is less than 1.0, distinguishly excellent heat resistance cannot be obtained. $\bar{x}$ is preferably more 1.4. Moreover, the ratio of $SO_2/SO_x$ is more than than 0.3, preferably more than 0.5, and more preferably more than 0.7. The ratio of $SO_2/SO$ is preferably more than 1.0, more preferably more than 2.0, and especially more preferably more than 3.0. Almost perfectly polysulfonated products in which the oxidized ratio of sulfur atoms in the polymer is more than 0.9 and the ratio of $SO_2/SO$ is $\geq 3$ is especially preferable because ultrahigh heat resistance can be obtained. In this case, the formation of the so-called three dimensional structure in which main chains are partially bonded with oxygen atoms and so on are allowable.

The bonds between the benzene ring and sulfur atoms in the main chain may be in either of the para or meta position, but the para bonding, where higher crystallinity can be obtained, is preferable. It is especially preferable that the para bondings are more than 90 mole %, balance meta. If the para bonding is less than 90 mole %, the crystallinity and transition temperature of the polymer obtained decrease, namely, heat resistance and chemical resistance are deteriorated. On the other hand, in the other bondings of less than 10 mole %, ether bonding, biphenyl bonding, naphthyl bonding, substituted phenyl sulfide bonding and so on may be present.

The hydroxyl group or oxygen atom and so on can partly add to the benzene ring in the above described structural unit formula.

As the fine structure of the fiber of the present invention, especially the degree of orientation according to wide angle X-ray diffraction, it is preferable that the value calculated from the strength distribution obtained by scanning the peak observed at the equatorial line scanning $2\theta = 16°$ to $17°$ in the circular direction is more than 60%.

If the degree of orientation is less than 60%, brittle fibers of low knot strength are often obtained. More than 80% is preferable and especially, if the value is more than 90%, fibers of high knot strength and heat resistance can be obtained. It is preferable that the size of the crystallit as observed at $2\theta = 16°$ to $17°$ is more than 20 Å, and more than 30 Å is more preferable. Meanwhile, in the polysulfide fibers having ordinary denier and in which only the surface layer is polysulfonated, crystallinity of the polymer is deteriorated and the size of the crystallit is small probably due to co-existing of various constituting units and thereby only low crystallinity and low strength can be obtained.

On the other hand, the fiber period in the fiber axis direction is preferably 9.5 to 10.5 Å and more preferably 9.5 to 10.0 Å. As the long period of the crystalline lamella, more than 100 Å is preferable.

Polyphenylene sulfone (hereinafter abbreviated as PPSO) fibers can be easily prepared from ultrafine fibers or porous fibers having a large surface area. As the ultrafine fibers, less than 0.5 denier of the monofilament denier is preferable and less than 0.1 denier is especially preferable. The reason is that the finer the fiber diameter, (1) fibers having high strength can be obtained, (2) fibrillation hardly occurs, (3) highly flexible fibers (bending resistance) can be obtained, (4) densely inter-entangled sheet-like products can be obtained, (5) especially when these fibers are used for filters, much smaller dust particles can be removed. On the other hand, as the porous fibers or porous films, it is preferable that the specific surface area is more than 0.4 $m^2/g$. More than 2.4 $m^2/g$ is more preferable and more than 10 $m^2/g$ is especially preferable. By having the porous fiber structure, fiber-like products (woven, knitted products, non-woven fabrics and so on) prepared from these fibers have the following desirable properties: (1) the amount of air retained in the fiber-like products is large thus providing excellent heat insulating properties and (2) as the fiber porosity is high, excellent liquid retention properties for various liquids, such as various solutions and electrolytes, can be obtained. Here, the specific surface area means the surface area per 1 g of the fiber and can be measured by means of the so-called BET (Brunauer-Emmet-Teller) method.

Next, a method for producing the PPSO fibers of the present invention will be explained below.

PPSO fibers of the present invention can be obtained by oxidizing polyphenylene sulfide (hereinafter abbreviated as PPS), preferably highly oriented PPS, more preferably highly oriented polyparaphenylene sulfide (hereinafter abbreviated as PPPS) fibers in which the para-bonding is more than 90%, with an organic peracid.

PPS can be obtained, for example, by reacting an alkali sulfide with a para-dihalogenated benzene in a polar solvent under high temperature and high pressure. It is especially preferable that sodium sulfide is reacted with para-dichlorobenzene in an amide-type polar solvent having high boiling point, such as N-methyl-pyrrolidone and the like.

Ultrafine fibers suitable for the purpose of the present invention, are prepared by previously known methods, such as meltblowing, superdrawing, removing a sea component from the multi-core composite fibers such as the islands-in-a-sea type composite fibers or the blend spun fibers, and making peel-off type composite fibers ultrafine by means of a physical or chemical treatment can be used and no special limitation exists. When ultrafine fibers such as islands-in-a-sea type composite fibers and so on are used, polymer substances having fiber formability, such as polystyrene, polyethylene, polypropylene, polyethylene terephthalate, polyamide and so on, can be used without any limitation as the binding component or the component removed by dissolution of said fibers. Polymers having a high melting point and hardly thermally-decomposed are preferable because PPS has a high melting point (about 280° C.). From the point of ease of spinning and solvent removal, copolymerized polyethylene terephthalate which is easily dissolved in alkali solution is preferable. Although the spinning temperature of PPS is high, polystyrene type polymers can be co-melt-extruded with PPS. It is a surprising fact that PPS can depress thermal decomposition of polystyrene type polymers, especially thermal decomposition in molten state, and that polystyrene type polymers prevent occurrence of nozzle clogging by PPS. These behaviors are not only for polystyrene alone but for styrene copolymers. Copolymers of styrene with a higher alcohol ester of acrylic acid and/or a higher alcohol ester of methacrylic acid are preferable; among them those polymers of higher viscosity are more preferable. Moreover, acrylonitrile-butadiene-styrene copolymers (ABS), acrylonitrile-styrene copolymers (AS), butadiene/styrene copolymers (BS), halogenated polystyrene and so on also show the same effect. Hereinafter these polymers are generally called PST.

Undrawn fibers thus obtained are then drawn and heat-treated, and preferably highly oriented. As the drawing ratio, drawing of more than 2 times is preferable when the take-up is carried out by an ordinary spinning speed (300 to 1,500 m/min) and it is desirable that drawing of more than 2.5 times, more preferably more than 3 times is carried out. By doing so, PPS fibers whose degree of orientation is more than 60% can be obtained. It is also possible to carry out the spinning at a speed higher than 4,000 m/min to highly orient the fibers without drawing. It is a surprising fact that co-melt-extrusion with another polymer gives better spinnability than the spinning of PPS alone. The reason is not entirely clear, but difficulties such as the occurrence of nozzle clogging decrease when molten PPS does not directly contact the nozzle.

Multi-core composite fibers obtained are converted into ultrafine fibers by removing intervening component with an appropriate solvent. Of course, a sheet consisting of ultrafine fibers can be obtained by solvent treatment after fibrous sheet-like materials such as woven fabrics, knitted fabrics, non-woven fabrics and so on are formed by using these fibers. By doing so, ultrafine highly oriented PPS fibers can be obtained.

Conventional well known technologies can be widely applied for producing porous fibers which are preferred examples of the present invention. Namely, the method in which the island component is removed from the islands-in-a-sea type fibers whose sea component is PPS and the method for producing the fibers by a dry, wet or dry-wet coagulation spinning of PPS solution can be used. Moreover, porosity can be created by drawing the fibers at a temperature below the glass transition point. In case of wet or dry spinning, because PPS is hardly dissolved at lower temperature and therefore it is necessary to heat the spinning solution above 200° C., wet or dry spinning is not a preferable method. On the other hand, when porous fibers are prepared from islands-in-a-sea type fibers, as the island component or the component removable by dissolution, polymeric substances having fiber formability and durability at the melt spinning temperature of PPS, such as polystyrene, polyethylene, polypropylene, polyethylene terephthalate, polyamide and so on can, be used without any limitation in the same way as the case of producing ultrafine fibers. From the point of ease of spinning and removing by a solvent, polystyrene, copolymerized polyethylene terephthalate being easily dissolvable in alkali solution and copolymers of styrene with a higher alcohol ester of acrylic acid and/or a higher alcohol ester of methacrylic acid are preferable; among them, polymers of high viscosity are more preferable.

Porous fiber forming type fibers thus obtained are converted into the porous state by using an appropriate solvent. Of course, sheet-like products consisting of porous fibers can be obtained by solvent treatment after the fibrous sheet-like materials such as filters, non woven fabrics and so on are formed.

Thereafter, the present invention can be achieved by reacting PPS ultrafine fibers or porous fibers with a sulfonating reagent below described to convert PPS into PPSO.

As the sulfonating reagents used in the present invention, oxidizing agents used for ordinary oxidation of chemicals can be used (but sulfuric acid and nitric acid are excluded) and peracetic acid, perbenzoic acid, performic acid, perpropionic acid, perbutylic acid, m-chloro-perbenzoic acid, pertrichloroacetic acid, pertrifluoroacetic acid and perphthalic acid are preferable among them. The treating conditions with the sulfonating reagents depend on several factors including the denier of the ultrafine fibers, the specific surface area of the porous fibers, the reaction velocity of the reagents and so on, and therefore are not generally specified but are easily determined by the skilled worker. In case of peracetic acid for ultrafine fibers of less than 0.5 denier and porous fibers and porous films of more than 0.4 $m^2/g$, high production rates of making PPSO can be achieved even at room temperature. Moreover, these organic peracids are explosive chemicals and therefore, ultrafine fibers and porous fibers and films of PPSO resulting from this high production process under low temperature are especially preferable. Organic peracids can be prepared by oxidation in an aldehyde in the presence of a catalyst (for example, the AMP method for peracetic acid), a vapor phase partial oxidation method, a syntheses using hydrogen peroxide and carboxylic acid anhydride or chloride and the reaction of diaroyl peroxide with sodium methaoxide.

It is preferable that the PPS fibers consist of polyparaphenylene sulfide (hereinafter abbreviated as PPPS) and especially preferable that more than 95 mole % consist of PPPS. If it is less that 90 mole %, the crystallinity, glass transition temperature and so on of the polymers so obtained decrease and it is therefore difficult to obtain fibers having excellent heat resistance and chemical resistance. In the other components of less than 10 mole % besides the above described main component of 90 mole %, ether, biphenyl, naphthyl, substituted phenyl sulfide and similar bondings can be contained. Moreover, cross-linking can be partly contained.

As the fine structure of the fiber of the present invention, especially the degree of orientation according to wide X-ray diffraction, it is preferable that the value calculated from the strength distribution obtained by scanning the peak observed at the equatorial line scanning $2\theta = 19°$ to $21°$ in the circular direction is more than 60%. If the degree of orientation is less than 60%, brittle fibers of low knot strength are often obtained. The degree of orientation is preferably more than 80% and especially, if the value is more than 90% and the fibers are highly oriented, fibers having high strength and excellent heat resistance can be obtained.

Moreover, it is preferable that the size of crystallit as observed at $2\theta = 19°$ to $21°$ is more than 20 Å.

On the other hand, the fiber period of the crystalline in the fiber axis direction is preferably 10 to 11 Å. PPS having such a fine structure has high strength, excellent heat resistance and excellent chemical resistance.

There is a an advantage if the denier of the PPS fibers is less than 0.5 denier-sulfonation reaction occurs easily and polysulfonation can be carried out in a short time. Moreover, the degree of orientation of the resulting PPSO fibers is very high and the physical properties of the PPSO fibers so produced becomes very high. For example, there is even an example that the degree of orientation is improved more than 10% by converting an ultrafine PPS fiber to PPSO. There is even another large merit that coloring of PPS fibers themselves can be reduced because ultrafine fibers can disperse light.

Moreover, PPS ultrafine fibers have the following characteristics: (1) high strength, (2) fibrillation hardly occurs, (3) the fibers are flexible (bending resistance), (4) densely inter-entangled sheet-like products can be obtained, and especially (5) they are durable against high pH.

Moreover, sheet-like products (woven, knitted products, non-woven fabrics and so on) prepared of these fibers have important inherent properties, such as the amount of air layer retained in these fiber-like products increases and excellent heat insulating properties can be thereby obtained. Also, as the porosity is high, excellent liquid keeping properties for various liquids such as various solvents and electrolytes can be obtained.

Because these characteristics exhibit their effects the finer the denier of the fibers, it is preferable that the PPS fibers are finer and less than 0.3 denier (hereinafter abbreviated as d) and less than 0.1 d is especially preferable.

Moreover, as described above, PPS also has the effect of improving the heat resistance of PST. The effect largely depends upon the kinds, compositions, applications and processing conditions of PST to be used. Although the amount of PPS to be added is not generally determined, it is necessary to determine the amount to be added by testing it properly in advance.

However, in general, based on 100 weight parts of polystyrene component in PST, more than 0.01 weight parts (hereinafter called part unless otherwise described) of PPS are preferable, more than 0.5 parts are more preferable and more than 3 parts are especially preferable. If the amount of PPS to be added is less than 0.01 part, the thermal decomposition resistance of PST is little improved. When mixing PST with PPS is carried out in powder form, it is sufficient to add more than 0.5 parts of PPS because both components can be very easily mixed together. But when both components are in the form of chips or when only PPS is in powder form and PST is in the form of chips, mixing is not smoothly done and thus more than 3 parts of the amount to be added are therefore preferable.

The present invention will be hereinafter described in more detail in connection with the examples.

EXAMPLE 1

50 parts of PPPS prepared by reacting sodium sulfide with para-dichlorobenzene in N-methyl-2-pyrrolidone in the presence of sodium benzoate under high temperature and high pressure and whose apparent viscosity was 3,700 poises at 300° C. as the island component and 50 parts of high viscosity polystyrene as the sea component were used for preparing islands-in-a-sea type composite fibers having 36 island components in a filament under such spinning conditions that the spinning temperature and the take-up velocity were 320° C. and 900 m/minute, respectively. The spun filaments were thereafter drawn by 3.7 times to obtain filaments of 72 deniers/24 filaments. Said filaments were cut into pieces 10 cm in length. Polystyrene as the sea component was extracted and removed in trichloroethylene, and the fibers were then dried. PPPS ultrafine fibers obtained whose monofilament denier was 0.04 denier have tensile strength of 3.8 g/d elongation of 29.2%. The degree of orientation of the fibers calculated from X-ray measurement was 80% and the size of the crystallit at 20.2° and the fiber period were 27 and 10.3 Å respectively.

These ultrafine fibers were treated in a peracetic acid solution (9% concentration in acetic acid) at room temperature for one hour and thereafter washed, neutralized, washed and dried. The ultrafine fibers thus obtained showed the weight increase of 26% and the monofilament denier was 0.05 denier. Tensile strength, elongation and knot strength of the fibers were 3.1 g/d, 22% and 2.2 g/d, respectively.

These fibers were immersed overnight in concentrated nitric acid solution whose specific gravity was 1.42 and the rate of tenacity retention was measured after taking them out. It was found that the rate of tenacity retention for these fibers was 95%, which was very high. As the heat resistance, the rate of tenacity retention after exposure in air at a high temperature, such as 300° C. for 24 hours, was 100%, which was very excellent.

These fibers were analized by solid state high resolution NMR and ESCA (Electron Spectroscopy for Chemical Analysis) and it was found that the structural units of the fibers consisted of 83 mole % of

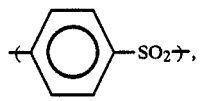

13 mole % of

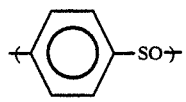

and 4 mole % of

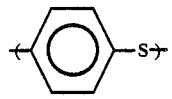

and the degree of orientation at $2\theta = 16.3°$ determined by means of wide angle X-ray diffraction was 91%.

EXAMPLE 2

Islands-in-a-sea type fibers having seven island components in a filament and in addition a number of ultrafine fiber components in each island component, and consisting of 35 parts of PPPS (which is the same as in example 1 as the ultrafine fiber component) and 65 parts of a copolymer of acrylic acid and styrene as the binding component were spun in 1,200 m/minute, drawn by 3.5 times, crimped. Staple fibers prepared of the islands-in-a-sea type fibers whose fiber length and denier were 51 mm and 4.0 denier, respectively, were obtained. The average denier of the ultrafine fiber components was 0.002 denier.

A web was prepared by treating these staple fibers by carding and a crosswrapper, and then needle-punched to prepare non-woven fabrics whose weight and apparent density were 200 g/m$^2$ and 0.17 g/cm$^2$, respectively. Thereafter, high speed columnar water streams were ejected on both sides of the non-woven fabrics under a pressure of 100 kg/m$^2$ through nozzle arranged in line at a pitch of 1.5 mm whose hole diameters were 0.20 mm while the nozzles were being oscillated to densely interentangle the fiber. Thereafter, the whole of these islands-in-a-sea type fibers became ultrafine fibers by almost completely extracting the above described copolymer component in trichloroethylene.

Next, the fibers were sulfonated in the same way as example 1. The non-woven fabrics obtained had a fiber structure in which ultrafine fibers of polyphenylene sulfone densely entangled each other. The rate of sulfonation was 95%, as measured by ESCA. The degree of orientation was measured using a sample prepared by bundling drawn filaments before crimping, cutting them to pieces 10 cm in length and removing the sea component using X-ray analysis. The value was 90% and it was therefore confirmed that the fibers were highly oriented. The fibers were in the form of a sheet having an effective dimensional stability, although there was no binder between the fibers. Moreover, after keeping the fabrics in air at a high temperature of 290° C. for 24 hours, almost no coloring was observed and sufficient tenacity was retained.

EXAMPLE 3

Islands-in-a-sea type composite fibers consisting of 50 parts of the same PPPS as the example 1 as the sea component and 50 parts of high viscosity polystyrene as the island component having 36 islands in a filament were spun under the conditions that the spinning temperature was 320° C. and the take-up velocity was 900 m/minute. Thereafter the fiber was drawn by 3.7 times at 100° C. and was heat-set at 220° C. to produce a filament yarn of 72 denier/24 filaments. These filament yarns were cut into pieces 5 cm in length and the polystyrene of the island component was extracted and removed in trichloroethylene; the resultant fibers were dried. PPPS porous hollow fibers thus obtained, whose specific surface area was 1.6 m$^2$/g, were treated in a paracetic acid solution (the concentration was 9% in acetic acid) for 3 hours, washed, neutralized, washed and dried.

The weight of the porous hollow fibers thus obtained increased by 29% and the specific surface area was 1.24 m$^2$/g.

These fibers did not decomposed in a concentrated nitric acid solution.

The rate of sulfonation of these fibers was analyzed by means of ESCA and was found to be 98%.

EXAMPLE 4

60 parts of PPPS the same as the example 1 and 30 parts of high viscosity polystyrene were melted and blended at 320° C. and were extruded from a nozzle having 100 holes, spun at a take-up velocity of 900 m/minute, drawn by 3.5 times at 100° C., heat-set at 220° C. to obtain composite fibers whose monofilament denier was 3 d. The fibers were thereafter cut into sections 51 mm in length and a web was formed by a carding machine. A non-woven fabric whose weight was 500 g/m$^2$ was obtained by needle-punching the web.

The non-woven fabric thus obtained was thereafter immersed in trichloroethylene and the polystyrene in it was almost completely extracted and removed. Thereafter, the extracted non-woven fabric was treated with 9% peracetic acid in acetic acid solution at 50° C. for 1 hour and, washed, neutralized, washed and dried.

The non-woven sheet thus obtained was a sheet consisting of porous fibers consisting mainly of PPSO (whose rate of sulfonation was 95% measured by ESCA) and whose specific surface area was 16 m²/g. The non-woven sheet had excellent heat insulating property, did not melt and fuse at a high temperature of 300° C. and had distinguished heat resistance.

EXAMPLE 5

PPPS pellets the same as those used in example 1 were spun at a spinning temperature and take-up velocity of 330° C. and 450 m/minute, respectively. The filaments obtained were thereafter drawn by 4.0 times under drawing conditions such that the hot roller temperature and the hot plate temperature were 90° and 200° C., respectively, to obtain filaments of 75 denier/24 filaments. Tensile strength of the PPPS fibers obtained was 3.5 g/d.

Next, these fibers were treated in a commercially available peracetic acid solution (9% concentration in acetic acid) at room temperature (30° C.) for 2 weeks and thereafter washed, neutralized, washed and dried. The fibers thus obtained showed a weight increase of 24% in comparison with the original PPS fibers, and the tensile strength and the breaking strength were 2.6 g/d and 18%, respectively. These fibers were kept in air at temperatures of 290° C. for 24 hours and the tensile strength and elongation of the fibers before and after the test were measured. No change was observed on the strength-elongation characteristics and it meant that the fibers had very excellent heat resistance.

These fibers were analized by means of solid state high resolution NMR and ESCA, and it was found that the structural units of these fibers consisted of 75 mole % of

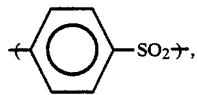

16 mole % of

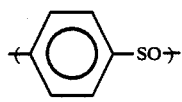

and 9 mol % of

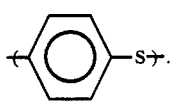

It was also found that the degree of orientation at $2\theta = 16.5°$ determined by wide angle X-ray diffraction was 91.3% and the size of fine crystals in said direction was 35 Å. It was thereby confirmed that the fibers had a highly oriented crystalline structure.

COMPARISON EXAMPLES 1 and 2

Instead of the treatment with peracetic acid in example 5, treatments in sodium hypochlorite 9% solution (1 mole of $H_2SO_4$ was used as compared with 2 mole of NaOCl) at room temperature for one day (comparison example 1) and at 90° C. for one hour (comparison example 2) were carried out. The fibers obtained in comparison example 1 showed a weight increase of 4%, while the fibers in comparison example 2 fell into pieces during the treatment; these pieces no longer had a fibrous shape.

The fibers obtained in comparison example 1 were put on a glass slide and heated from the bottom with the flame of an alcohol lamp, but they did not melt even when the surface temperature became 500° C. and it was thereby confirmed that the fiber surface had became unfusible. However, the strength of the fiber obtained in comparison example 1 decreased to 16 kg/mm², 36% of the original strength, by the treatment with sodium hypochlorite and the breaking elongation became 3%, too. It meant that the fibers had been changed into very brittle fibers. The rate of heat resistant tenacity retention, measured in the same way as example 1, was 32%, which was very low.

The fibers of comparison example 1 were analyzed by NMR, ESCA, IR, and it was found that besides 60 mole % of the original structural unit

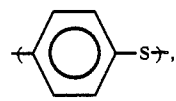

7 mole %

and 15 mole % of

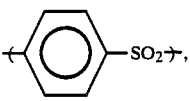

total 19 mole % of $-SO_4^{--}$ and $-SO_3^{-}$ had been prepared and the ratio of sulfur atoms to carbon atoms decreased from 0.27 to 0.18. It was thereby confirmed that a fairly large amount of main chain cleavaging occurred.

REFERENCE EXAMPLE 1

PPPS the same as the one in example 1 and polystyrene (Type 679 manufactured by Asahi Chemical Industries Co., Ltd.) were separately melted and then joined together in a spining nozzle pack to obtain composite fibers whose sheath and core were PST and PPPS, respectively. The preparing conditions were as follows:
(1) Sheath component/core component (weight ratio) = 60/40
(2) Melter temperature of PST = 280° C.
(3) Melter temperature of PPPS = 315° C.
(4) Temperature of the spinning nozzle pack part where PST and PPPS were joined together = 315° C.
(5) Spinning velocity = 1,000 m/minute
(6) Drawing ratio = 3.2 times
(7) Drawing temperature = 95° C.
(8) Denier X numbers of the fibers obtained = 150 denier × 50 filaments Both spinning and drawing can be smoothly carried out without difficulty. By treating the drawn filaments with trichloroethylene, good PPS fibers whose strength, elongation and degree of orientation measured by X-ray were 4 g/d, 30% and 89%, respectively, were obtained. It was surprising that less filamenet breakage occurred and better spinning can be carried out in composite spinning of PST and PPPS in comparison with the spinning of PPPS alone. Namely, the number of filament breakage (in spinning and drawing combined) were 3 times/t in the case of PPPS alone and 0.7 times/t in the case of PST and PPPS composite fibers.

REFERENCE EXAMPLE 2

3 parts of fine powder of PPS (manufactured by Phillips Petroleum Co. U.S.A.) were added to and mixed with 100 parts of polystyrene (Type 679 manufactured by Asahi Chemical Industries Co., Ltd.) and the mixture was put into a Petri dish and stirred at 300° C. to prepare a mixture of PST and PPS. This mixture was heated in air at 330° C. for one hour as a thermal decomposition test and it was found that the rate of weight decrease was 7.1%. The amount of decomposed gas generated by mixing at 300° C. was very little by visual observation.

The same test was carried out on the composition without PPS in the same manner and it was found that the rate of weight decrease of PST was 18.7%. Moreover, when only PST was stirred at 300° C., a large amount of decomposed gas occurred. An extremely large amount of decomposed gas occurred at 330° C. and there was concern that ignition might occur.

Polyphenylene sulfone fibers of the present invention do not deteriorate with concentrated sulfuric acid and nitric acid and have excellent heat resistance and chemical resistance.

Therefore, the fibers resulting from this invention can be favorably applied for filters for refining concentrated sulfuric acid and nitric acid for which demands have been recently growing, various filters for desulfuration and denitration apparatus of chimney gas, and filters, sheet-like materials and the like used in the fields where outstanding heat resistance and chemical resistance are required, for example, battery separators, fused membrane and the like.

We claim:

1. Polyphenylene sulfone fibers consisting essentially of a polymer composed of individual structural units represented by the formula:

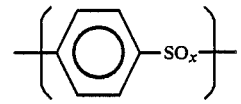

where X is 0, 1 or 2, the average value of X falls within the range of about 1.0 to 2.0 and the molar ratio of $SO_2/SO_x$ is more than 0.3.

2. Polyphenylene sulfone fibers as claimed in claim 1 in which the oxidized ratio of sulfur atoms in the polymer is more than 0.9 and the ratio of $SO_2/SO$ is equal to or more than 3.

3. Polyphenylene sulfone fibers as claimed in claim 1 in which the average value of x is 1.4 to 2.0

4. Polyphenylene sulfone fibers as claimed in claim 1 in which the rate of orientation is more than 60%.

5. Polyphenylene sulfone fibers as claimed in claim 1 in which the specific surface is more than 0.4 $m^2/g$.

6. Polyphenylene sulfone fibers as claimed in claim 1 in which the fibers are porous.

* * * * *